No. 690,407. Patented Jan. 7, 1902.
F. W. DENT.
WRENCH.
(Application filed Sept. 20, 1901.)
(No Model.)
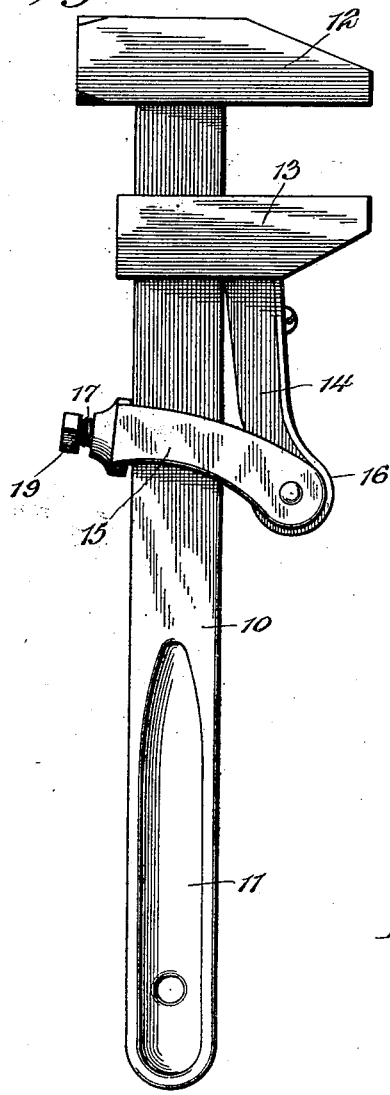
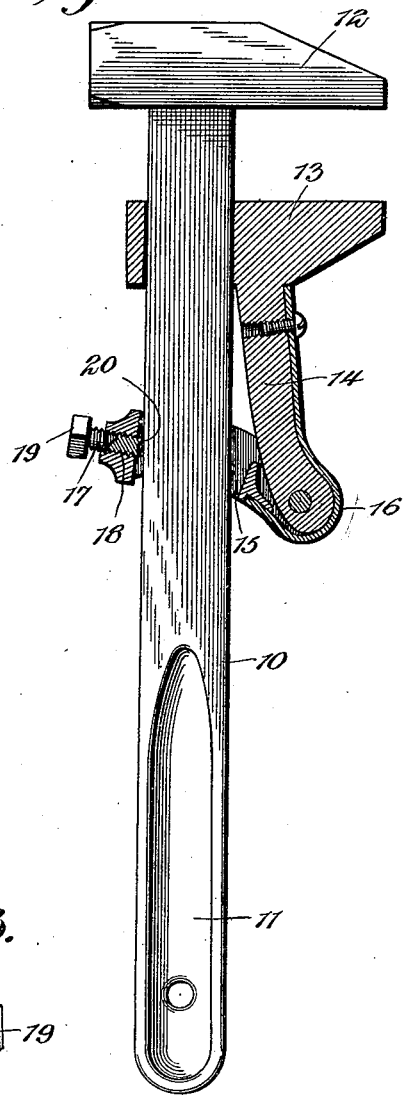
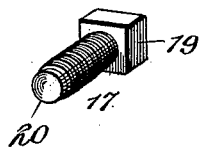
F. W. Dent, Inventor

UNITED STATES PATENT OFFICE.

FRANK W. DENT, OF WAUKESHA, WISCONSIN, ASSIGNOR OF TWO-THIRDS TO GEORGE W. SWAGGART AND BYRON GRIFFIN, OF WAUKESHA, WISCONSIN.

WRENCH.

SPECIFICATION forming part of Letters Patent No. 690,407, dated January 7, 1902.

Application filed September 20, 1901. Serial No. 75,769. (No model.)

*To all whom it may concern:*

Be it known that I, FRANK W. DENT, a citizen of the United States, residing at Waukesha, in the county of Waukesha and State of Wisconsin, have invented a new and useful Wrench, of which the following is a specification.

The present invention relates to wrenches, and while particularly intended as an improvement on the construction shown in the patent granted to William T. Hatten on January 16, 1900, and numbered 641,451, it will be readily seen that it may be employed upon wrenches of various kinds employing a movable holding-clutch that engages a shank. The invention is therefore not limited in its application solely to the Hatten structure, and, furthermore, it is capable of use on either pipe or nut wrenches. In the wrenches of this character as heretofore placed upon the market each clutch-loop has been provided with a straight tooth or edge that extends transversely across the shank. This tooth or edge in time becomes worn, so that the clutch often slips, especially when a wrench is used on heavy work. This results partially because of the worn edge and partially by reason of the greater space occasioned thereby between the shank and the loop, which will sometimes cause another portion of the loop to contact with the shank. Furthermore, this straight edge usually creases the shank, and creases thus formed continually deepen until they are the only places in which the loop will hold, thus greatly limiting the adjustability of the wrench. The present improvement is aimed to overcome all of these objections, first, by providing a tooth which may be adjusted on the loop toward and from the shank, thus obviating the change in distance due to wear, and, secondly, by so constructing this tooth that a new bearing surface or edge may be brought into place, this edge being so formed that it will not be as liable to make creases in the shank as with the above-mentioned device.

The structure which has been found entirely satisfactory under the most rigid tests and which is now considered preferable is shown in the accompanying drawings and described in the following specification.

It will of course be understood that such changes may be made from the construction shown as the scope of the appended claims will permit.

In the drawings, Figure 1 is a side elevation of the Hatten wrench, showing the improvement applied thereto. Fig. 2 is a sectional view through the same. Fig. 3 is a detail perspective view of the tooth detached.

Similar numerals of reference designate corresponding parts in all the figures of the drawings.

The wrench as shown comprises a shank 10, one end of which is formed into a handle 11, the other end carrying the usual stationary jaw 12. On this shank is slidably mounted the movable jaw 13, having an offset arm 14, which lies along the shank and carries at its free end a pivoted clutch-loop 15. A spring 16 is secured to the arm which carries this loop to normally hold it at an inclination to the shank. As thus far described the construction is well known, and no claim is laid thereto.

The invention resides in a tooth 17, carried by the clutch 15 and arranged to engage the shank 10 on the side opposite the jaw 13. This tooth is shown in the form of a screw-shank, which is threaded into an opening 18, formed in the loop, and having at its outer end an angular head 19. By referring to Fig. 3 of the drawings it will be seen that the inner end of this shank has a concaved socket or cup, thereby forming a circular biting edge 20.

In operation the circular biting edge is normally held in contact with the rear face of the shank by the spring 16, thus holding the jaw 13 against movement. A circular bearing is thus provided which by experience it has been found will not create deep creases in the shank. Furthermore, should the bearing portion of the edge become worn by rotating the tooth a fresh edge will be presented. The wear between the coacting portions may be taken up by moving the tooth inwardly, and, if necessary, said tooth may be entirely removed and either sharpened or replaced by a new one at very little expense.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

1. In a wrench, the combination with a shank carrying a jaw, of another jaw slidably mounted upon the shank and coacting with the jaw thereof, a clutch pivoted upon the slidable jaw and having a swinging relation with the shank, and a holding-tooth carried by the clutch and engaging the shank, said tooth being movable upon the clutch toward and from the shank and being furthermore movable with the clutch out of and into engagement with the shank upon the swinging of said clutch.

2. In a wrench, the combination with a shank carrying a jaw, of a movable jaw slidably mounted upon the shank and coacting with the jaw thereof, a clutch having a pivotal connection with the movable jaw, said clutch surrounding and having a swinging movement upon the shank, and an adjustable tooth threaded upon the clutch and having a biting portion on its inner end that is arranged to engage the shank and is movable toward and from the same, said tooth being also movable out of and into engagement with the shank upon the swinging of the clutch.

3. In a wrench, the combination with a shank carrying a jaw, of a movable jaw coacting with the jaw of the shank, and a clutch having a pivotal connection with the movable jaw and carrying a circular biting edge arranged to engage the shank.

4. In a wrench, the combination with a shank carrying a jaw, of a movable jaw coacting with the jaw of the shank, a clutch having a pivotal connection with the movable jaw, and a rotatable tooth carried by the clutch and having a circular biting edge arranged to engage the shank.

5. In a wrench, the combination with a shank carrying a jaw, of a movable jaw slidably mounted upon the shank and coacting with the jaw thereof, a clutch having a pivotal connection with the movable jaw and surrounding the shank, and a tooth threaded upon the clutch and having a circular biting edge on its inner end, said biting edge being arranged to engage the shank.

6. In a wrench, the combination with a shank carrying a supporting-jaw at one end, of a movable jaw having a portion surrounding the shank and slidable thereon, a clutch pivoted to the movable jaw and surrounding the shank, said clutch having a sliding swinging movement with respect to the shank, and an adjustable tooth threaded in the clutch and arranged to be moved into and out of engagement with the shank upon the swinging of said clutch.

In testimony that I claim the foregoing as my own I have hereto affixed my signature in the presence of two witnesses.

FRANK W. DENT.

Witnesses:
GEO. M. S. JEWETT,
WM. SHAW.